April 11, 1933.      J. J. LAUSTER      1,903,736
NONREUSABLE COUPLING
Filed March 11, 1932

WITNESSES

INVENTOR
John J. Lauster
BY Munn & Co.
ATTORNEYS

Patented Apr. 11, 1933

1,903,736

UNITED STATES PATENT OFFICE

JOHN J. LAUSTER, OF ST. ALBANS, NEW YORK, ASSIGNOR TO GEORGE T. RITCHINGS, OF MAPLEWOOD, NEW JERSEY

NONREUSABLE COUPLING

Application filed March 11, 1932. Serial No. 598,227.

This invention relates to a non-reusable coupling which is designed to be fractured and destroyed when subjected to a force sufficient to effect its uncoupling, and the said invention is an improvement upon a similar device set forth in my copending application, Serial No. 470,169, filed July 23, 1930.

The present invention aims for its principal object to generally improve and simplify the structure of the prior invention in order to decrease the cost of production, and when employed in its principal use as a means of connection between the fluid supply line and a meter intake nipple, functions to avoid the necessity of altering the construction of the standard nipples now in general use.

More particularly, the present invention resides in an improved means for fracturing the coupling which includes notched portions formed in the coupling and in one of the members to be coupled, together with a split resilient washer interposed between said elements and having its opposite ends respectively engaging the notched portions to lock the same upon attempted movement of the coupling in a direction to effect uncoupling.

As a still further object, the invention comprehends a fractural coupling element which is constructed of a plurality of initially fused metals which have different fusing or melting points, whereby the element when fractured is not susceptible of being readily welded or repaired without detection.

With the above recited and other objects in view, reference is had to the following description and accompanying drawing, in which there is exhibited one embodiment or example of the invention, while the claims define the actual scope of the same.

Figure 1:
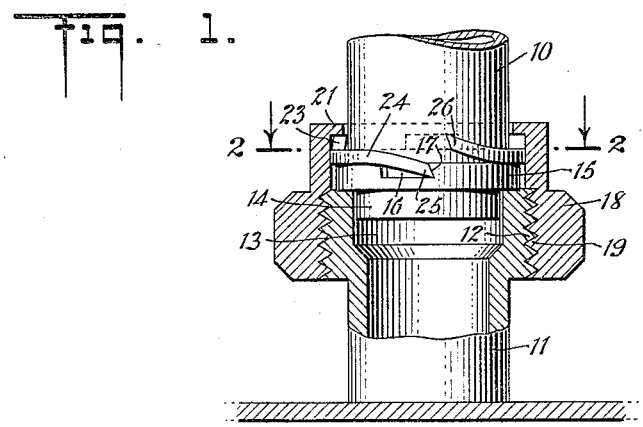
Figure 1 is a longitudinal sectional view through a coupling or union constructed in accordance with the invention and illustrating the same actively locked in position to couple the members.
Figure 2:
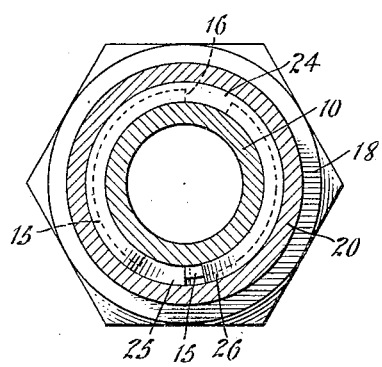
Figure 2 is a transverse sectional view taken approximately on the line indicated at 2—2 in Figure 1.
Figure 3:
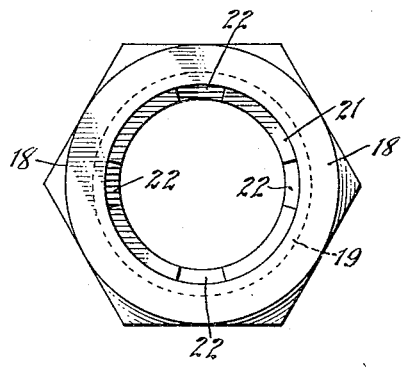
Figure 3 is an end view of the union or coupling nut.

Referring to the drawing by characters of reference, 10 and 11 designate respectively a pair of conduit sections or other members which are designed to be coupled, the latter being formed with an external thread 12 and an enlarged internal bore 13. The section 10 is formed with a reduced end 14 designed to be received in the bore 13 and is further provided with an annular external rib 15 adapted to seat against the end of the section 11. The rib 15 is provided with one or more notches 16 in its outer face, one end of each notch being beveled as at 17. The union or coupling nut or element 18 is provided with a threaded bore 19 to engage the threads 12 of the section 11, and said element or nut 18 is further provided with a collar 20 which is of a diameter to accommodate the rib 15 and which is provided at its outer end with an inwardly directed annular flange 21 formed with one or more, and preferably a plurality of notches 22 in its inner face, the notches being preferably provided with a beveled end wall 23. In practice, a combined retrograde locking and fracturing element 24 is employed, which is in the nature of a split resilient washer having oppositely offset beveled ends 25 and 26. The washer 24 is located within the collar 20 and interposed between the confronting faces of the rib 15 and flange 21. When the nut or element 18 is screwed home, the beveled extremities or terminals 25 and 26 of the washer 24 respectively engage with the beveled ends 17 and 23 of the notches 16 and 22, so that any attempt to unscrew the coupling element or nut 18 will result in a fracturing of the nut or element. In this connection, it may be mentioned that the nut or element 18, together with its collar 20 and flange 21, is constructed of a readily fracturable material formed of a plurality of initially fused metals which have relatively different fusing points, whereby the same when fractured cannot be readily welded or repaired without detection.

In one of its principal uses, the device is employed for connecting a gas or other fluid supply line to a meter intake and any attempts to disconnect and reconnect the supply line with the meter for fraudulent purposes will be readily detected, in view of the fact that unauthorized persons cannot secure a new union or coupling element 18 to replace one that has been fractured.

What is claimed is:

1. The combination with a pair of members to be coupled, of a non-reusable coupling movable in one direction with reference to said members to effect coupling thereof and cooperative means for fracturing the coupling element upon movement in an opposite direction, said means including notched portions of the coupling element in one of said members and a split resilient element interposed therebetween with the opposite ends engageable respectively with the notched portions to lock the same upon attempted movement of the coupling in said opposite direction.

2. The combination with a pair of members to be coupled, of a fracturable coupling element turnable in one direction with reference to said members to effect coupling thereof and means independent of said members and interposed between one of them and said element permitting of turning of the element to effect the coupling and locking the same against retrograde turning movement for fracturing the coupling.

3. The combination with a pair of members to be coupled, of a coupling element carried by and swiveled on one of said members and threadedly engaging the other member and interengageable means on said element and said first mentioned member for fracturing said element upon retrograde turning movement thereof, said means including notched portions formed on said first mentioned member and on said coupling element and a split resilient washer having its opposite ends respectively engaging said notched portions for locking said element against retrograde movement.

4. A non-reusable coupling element having notches defining weakened portions adapted to fracture upon uncoupling thereof and an independent split resilient ring adapted to cooperate with said notches and with one of a plurality of members to be coupled for causing fracturing of said coupling element upon relative movement thereof with reference to said member when attempting to uncouple the same.

5. In combination, a pair of mating communicating fluid conduit sections, an annular rib formed on one of said sections for contact with the end of the other section when the sections are coupled, the other section having a threaded periphery, a union carried by and swiveled on the rib section, the confronting faces of the rib and union having notches and a split resilient ring surrounding said rib section and interposed between the confronting notched faces of the rib and the union, said ring having oppositely offset opposite ends permitting of turning movement of the coupling in a direction to couple the sections and functioning to fracture the union upon attempted turning movement in the opposite direction to uncouple the sections.

JOHN J. LAUSTER.